United States Patent [19]

Dreinhoff et al.

[11] Patent Number: 4,870,502
[45] Date of Patent: Sep. 26, 1989

[54] OPTICAL SCANNER

[75] Inventors: Karl-Heinz Dreinhoff; Andre-Heinrich Meinhof, both of Berlin, Fed. Rep. of Germany

[73] Assignee: Siemens Aktiengesellschaft, Berlin and Munich, Fed. Rep. of Germany

[21] Appl. No.: 150,892

[22] Filed: Feb. 1, 1988

[30] Foreign Application Priority Data

Jan. 30, 1987 [DE] Fed. Rep. of Germany ....... 3703217

[51] Int. Cl.⁴ .............................................. H04N 1/04
[52] U.S. Cl. .................... 358/474; 358/494; 355/233
[58] Field of Search ............... 358/293, 256, 294, 285; 355/8; 379/100; 250/578

[56] References Cited

U.S. PATENT DOCUMENTS

| | | | |
|---|---|---|---|
| 3,867,569 | 2/1978 | Watson | 358/293 |
| 4,316,665 | 2/1982 | Mochizuki et al. | 355/1 |
| 4,346,984 | 8/1982 | Kingsley | 355/8 |
| 4,446,364 | 5/1984 | Hayashi et al. | 358/8 |
| 4,448,514 | 5/1984 | Fujii et al. | 355/8 |
| 4,511,237 | 4/1985 | Kawata et al. | 355/3 R |

FOREIGN PATENT DOCUMENTS

| | | |
|---|---|---|
| 3111746 | 1/1982 | Fed. Rep. of Germany . |
| 3141452 | 6/1982 | Fed. Rep. of Germany . |
| 61-4360 | 1/1986 | Japan ................................... 358/293 |
| 2061536 | 5/1981 | United Kingdom . |
| 2161288 | 1/1986 | United Kingdom . |

OTHER PUBLICATIONS

Hosaka, Japanese Patent No. 58-178660, 10/19/83, Patent Abstracts of Japan, vol. 8, No. 17(E-223) [1454], Jan. 25, 1984.

*Primary Examiner*—Edward L. Coles, Sr.
*Attorney, Agent, or Firm*—Hill, Van Santen, Steadman & Simpson

[57] ABSTRACT

An optical scanning device, which includes a transparent support plate having a supporting surface on which an original is positioned, a scanner carriage being mounted for transverse movement below the support plate on two guide elements extending parallel to each other characterized by the guide elements being frame parts having surfaces forming the guide tracks for the carriage and also having surfaces facing the guide tracks for engaging the supporting surface of the support plate so that the distance between the supporting surface and the scanner is determined by the position of the seating surface relative to the guide track.

15 Claims, 3 Drawing Sheets

OPTICAL SCANNER

BACKGROUND OF THE INVENTION

The present invention is directed to an optical scanner device which has a transparent support plate for supporting an original to be scanned line-by-line and has a scanner carriage which supports a line-shaped light receiving means or device. The scanner carriage is positioned in a displaceable fashion under the support plate on two parallel guide elements which extend transversely relative to the line direction of the light receiving means and parallel to the surface of the support plate.

U.S. Pat. No. 4,346,984, whose disclosure is incorporated by reference and which was the basis for German Published Application No. 31 41 452, discloses a scanning device for copying technology. The scanning device had a transparent supporting plate of glass, which serves as the support for the original to be scanned. A scanner carriage is displaceably mounted under the supporting plate and is mounted for displacement parallel to the supporting plate on two parallel guide elements fashioned as round guide rods. A line-shaped light-receiving means in the form of a scanner mirror is arranged on the scanner carriage, and this scanner mirror, given the displacement motion of the scanner carriage, projects the original through a stationary optical imaging system onto a stationary opto-electronic image sensor in a line-by-line manner. Due to a comparatively long beam path between the original lying on the support plate and the optical imaging system, a sharp, line-by-line imaging of the original on the image sensor is achieved.

In order to be able to scan an original line-by-line without the involved position of the optical imaging system, U.S. Pat. No. 4,446,364, whose disclosure is incorporated by reference and which is based on the same Japanese Patent Application as the Published German Application No. 31 11 746, discloses that the original is introduced into a gap between a conveyor drum and a line-shaped light receiving means in the form of a photo diode row and that the original can be conducted past the light receiving means in contact therewith by turning of the conveyor drum. Such a scanner means, however, is only suitable for the optical scanning of individual loose-leaf originals.

SUMMARY OF THE INVENTION

The present invention is directed to an improvement in an optical scanner having a transparent support plate for supporting an original which is to be scanned line-by-line, and having a scanner carriage carrying a line-shaped light receiving means for receiving light from the original and being mounted under the support plate on two parallel guide elements to be displaced transversely relative to the line direction of the receiving means and parallel to the plane of the supporting plate. The improvements are that both guide elements are fashioned as frame parts, each frame part has a guide track for supporting the scanner carriage and has at least one seating surface facing towards the guide track and being spaced a predetermined distance therefrom, said support plate has its supporting surface for the original lying against the seating surfaces under influence of pressure elements.

A significant advantage of the scanner of the invention is that it guarantees an extremely precise distance between the original to be scanned and the light receiving means within an extremely slight range of tolerance. This is possible because its spacing between the guide track, which is a supporting surface for the scanner carriage carrying the light receiving means and the seating surface for the supporting surface of the support plate is determined by a single tool-bound measure used in the manufacturing of the frame part due to the inventive mounting of the scanner carriage and support plate in the two frame parts. The dimensions of the frame parts determine the distance between the guide track and seating surface of each frame part. Over and above this, only the structure of the scanner carriage has any influence on the tolerance of the distance between the original and the light receiving means.

In that no further or additional parts, other than the two frame parts, influence the distance between the supporting surface for the original and the guide track for the scanner carriage in the present invention, there is the advantageous possibility of manufacturing all of the housing parts of the scanner means with substantially greater tolerances and more inexpensively.

Another advantage of the present invention is that it eliminates involved adjustment work of positioning the guide elements for the scanner carriage to determine the distance between the supporting surface of the support plate and the light receiving means. Since the distance between the guide track and the seating surface of each of the frame parts is fixed, the placement of the preadjusted scanner carriage onto the guide tracks of the two frame parts simultaneously fixes the distance between the supporting surface of the support plate and the light receiving means without any additional adjustment work being required.

In view of the narrow tolerances within which the distance between the original to be scanned and the scanning light receiving means can be set, given the scanner means of the present invention, the light receiving means, in the advantageous embodiment of the invention, is composed of an opto-electronic line sensor which is arranged on the scanner carriage immediately under the support plate. A sharp imaging is, thus, always guaranteed without any additional optical imaging apparatus due to the exact observation of the distance between the line sensor and the original.

An embodiment of the scanner of the invention is distinguished by an especially simple structure. In this embodiment, both frame parts are fashioned in the form of a plate having recesses or apertures whereby the guide tracks and seating surfaces are edges of the recesses or apertures. The plates are thereby, preferably, sheet metal parts whose recesses are punched with a high precision in the sense of the exact observation of the distance between the guide tracks for the scanning carrier and the seating surface for the support plate. Projections fashioned in the plates during the punching operation are conceivable as pressure elements which extend under the support plate at its sides facing away from the supporting surface and press it against the seating surfaces.

In accordance with another preferred embodiment of the scanner of the invention, the two frame parts are profile rails. Each rail, on one side, has a first projection which forms the guide tracks and a second projection to form the bearing surface. The rails are positioned with the projection of one rail facing the projection of the other rail and the support plate has two parallel edges of its supporting surface lying against the seating surface of the two rails. The first and second projects will be parallel to each other so that the distance between the guide track and bearing surface is constant.

Differing from the round guide rods for the scanner carriage as provided in the device of U.S. Pat. No. 4,346,984, the profile rails of the scanner of the present invention exhibit a high section modulus in the direction of their weight load due to the scanner carriage and, thereby, hardly sag. Over and above this, even slight sags of the profiled rails, or even a warped position of the two profile rails relative to one another only has an extremely slight influence on the required spacing tolerances between the original and the light receiving means, because the support plate has its supporting surface lying against the seating surfaces of the two profile rails and is also co-deformed in accordance with the shape and position deviations of the profile rails, including the two guide tracks for the scanner carrier. The two profile rails can be optionally fashioned as extruded profiles, as injected plastic parts, as metal diecast parts of as bent sheet metal profiles.

While avoiding additional piece parts, a reliable mounting for the support plate for the original is advantageously achieved in that both profile rails each has a third projection, which is located between the first and second projections. Respective pressure elements are arranged between the third projection and the support plate. The respective second and third projections in both profile rails, therefore, form a limitation for the acceptance channel, in which the support plate is seated in exact alignment along the seating surface of the second projection upon interposition of the respective pressure elements.

In this context, the pressure elements generally are fashioned as spring elements and are advantageously composed of an elastic strip which lies in a channel of the third projection. For example, a strip composed of rubber material or rubber tubing guarantees a uniform pressing of the support plate against the seating surface of the second projection of the appertaining profile rail in the region of both profile rails.

In a preferred embodiment of the scanner means of the invention, the scanner carriage is singly seated on one of the two guide tracks and is doubly seated on the other guide track. A stable bearing of the scanner carriage is always guaranteed in this way and, thus, in exact alignment of the light receiving means relative to the original is guaranteed.

The scanner carriage preferably includes rollers, which engage or rest on the guide tracks. An especially low friction and, thus, low wear guidance of the scanner carriage on the respective first projections of the two profile rails is achieved in this way.

In accordance with a construction of the scanner means of the invention, alternate to the above-mentioned roller bearings for the scanner carriage or carrier, the scanner carrier comprises slide members with which it rests on the guide track. This type of seating of the scanner carrier is particularly distinguished by its structural simplicity, especially in view of the observation of the spacing tolerances between the seating points of the slide members on the guide tracks and the light receiving means.

In order to guarantee an exact line-by-line original scanning in the scanning means of the invention, an appropriately precise and play-free alignment of the scanning carriage is required during its travel transversely relative to the line direction. In the formation of the frame part in the form of profile rails, an exact alignment of the scanner carriage transversely relative to its moving direction is achieved in this context while avoiding additional piece parts, merely on the basis of multiple exploitation of the two profile rails being achieved, by the guide tracks being laterally limited by projection-shaped guide strips on the first projection of the two profile rails.

In order to additionally assure, during the travel of the scanner carriage, that it rests on a guide track in play-free contact, the scanner carriage advantageously comprises abutments which extend under the first projection of each of the profile rails. The abutments are thereby optionally pressed against the respective profile rails by a spring action or set to dimension.

In the sense of multiple exploitation of the two profile rails, an advantageous improvement of the scanner means of the invention comprise a stop in the region between the first and second projections. The stop can be provided on the third projection. The stop limits the movement play of the scanner carriage in the direction towards the support plate. The stops of the two profile rails prevent the scanner carriage from disengaging from its guidance in the profile rail, given strong jolts to the scanner means of the invention such as, for example, jolts that may occur during transporting the device.

As already mentioned hereinabove, the particular advantage of the scanner means of the invention, in addition to being expressed in the exact guidance of the scanner carriage with reference to the original to be scanned is also expressed in the considerable simplification of the structure of the scanner means of the invention due to the multiple exploitation of the two profile rails. In this context, it is provided in an especially advantageous improvement of the scanner means of the invention that both profile rails each project beyond the limitation of the support plate transversely relative to the line direction in order accept guidance devices for the original. The acceptance channel between the second and third projections of the two profile rails, which channel serves for the acceptance of the transparent support plate, is thereby used as an acceptance for the device for guiding the original which, just like the light receiving means, must be exactly positioned relative to the supporting surface for the original. This is achieved without incurring additional outlay, particularly including among the guide means for the original are paper guiding rails, hinge covers or feeder devices for originals.

Other advantages and features will be readily understood by the following description of the preferred embodiments, the drawings and claims.

DESCRIPTION OF THE PREFERRED EMBODIMENTS

Figure 1:
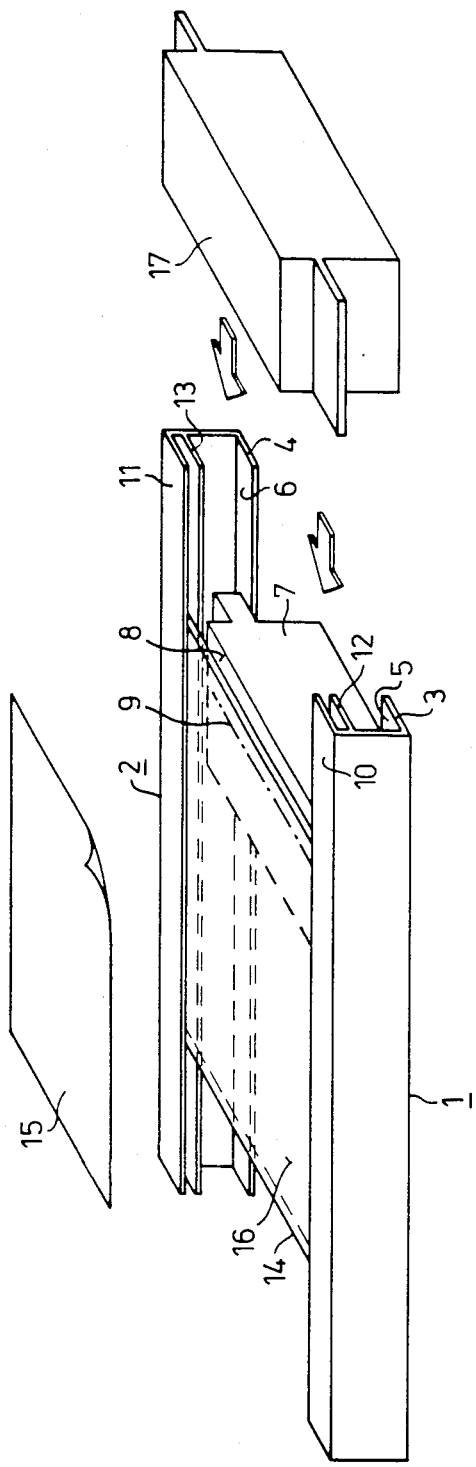
FIG. 1 is an exploded profile view of a first exemplary embodiment of the scanner means of the present invention.
Figure 2:
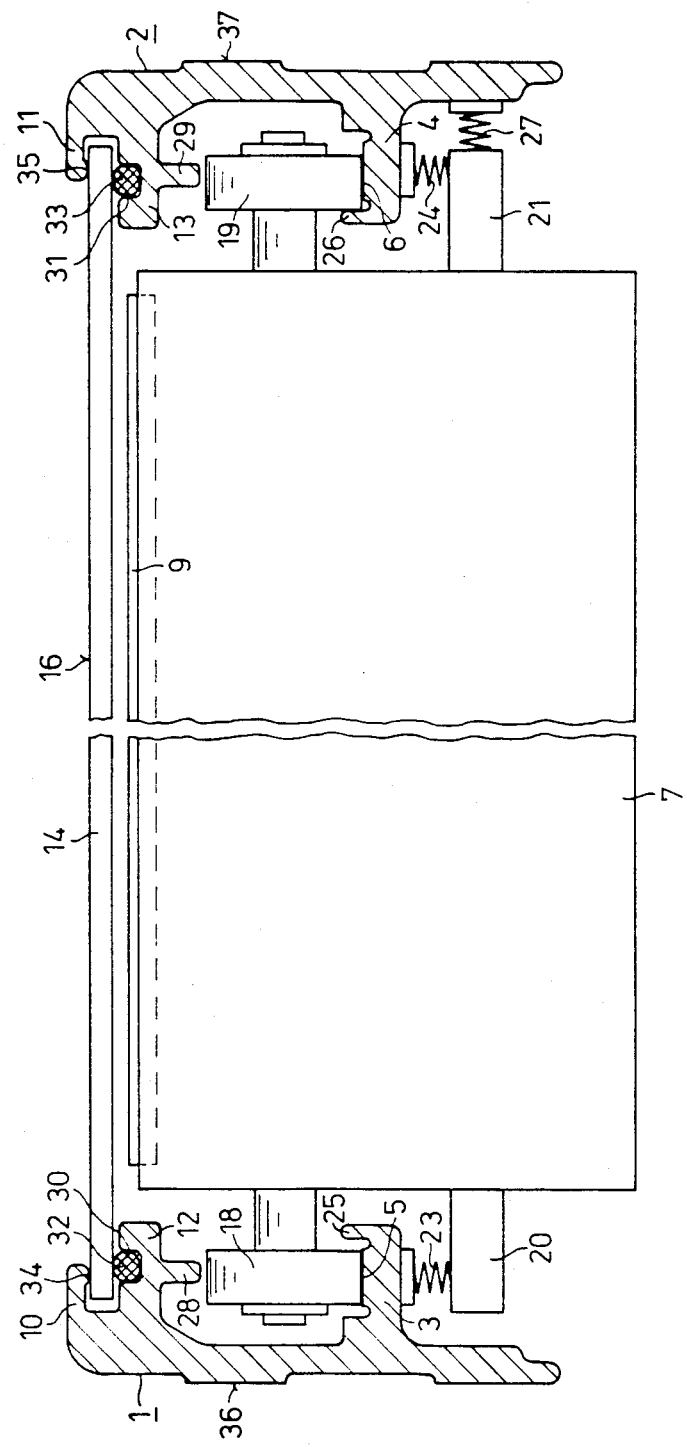
FIG. 2 is a cross sectional view, with portions in elevation for purposes of illustration, of the embodiment of FIG. 1.

The principles of the present invention are particularly useful for a scanner means, which is illustrated in FIGS. 1 and 2 and comprises two frame parts 1 and 2 in the form of profile rails which lie opposite one another and parallel at its side facing towards the respective opposite profile rail. Each of the two profile rails 1 and 2 has a first projection 3 or 4, respectively, on which guide tracks 5 or 6, respectively, for a scanning carrier or carriage 7 are constructed. The scanner carriage 7 is seated to rest on the guide tracks 5 and 6 and for displacement along the two profile rails 1 and 2. The scanner carriage 7, on an upper side or surface 8, carries a line-shaped light receiving means 9, which is indicated in FIG. 1 as a broken line, which extends transversely relative to the profile rails 1 and 2 and is composed of an opto-electronic line sensor.

Above the first projections 3 and 4, both profile rails 1 and 2 each have a second projection 10 and 11, respectively. The second projections 10 and 11 comprise a seating surface, which is not visible in FIG. 1, which faces towards the respective guide tracks 5 or 6. Each of the guide rails 1 and 2 have a third projection 12 or 13, respectively, which extends between the first and second projections. The third projection together with the second projection of each rail form an acceptance channel for a transparent support plate 14, which extends over the scanner carriage 7. In the region of the two parallel edges, the support plate 14 has its upper directed supporting surface 16, which serves for the acceptance of the originals 15 to be scanned, pressed against the seating surface (not visible) of the respective second projections 10 and 11 by pressure elements which are positioned between the third projections 12 and 13 and the support plate 14 to press the support plate 14 against the seating surface of the respective second projections 10 and 11.

For both the profile rails 1 and 2, the distance between the respective guide tracks, such as 5 or 6 of the first projections 3 and 4, respectively, and the seating surface of the second projections 10 and 11, respectively, occurs from a single tool-bound dimension used during the manufacturing of the profile rails 1 and 2. Differing from known scanner means, the requirement of an adjustment of the guide tracks relative to the support plate for the original is, thus, eliminated. Since only the profile rails 1 and 2 are critical to the tolerance with respect to the distance between the guide tracks 5 and 6 and the support surface 16 of the support plate 14, the unit shown in FIG. 1 can be integrated into a housing (not shown here) as a finished unit. This housing is capable of being manufactured in an especially simple manner and cost beneficially with significantly greater tolerances.

As FIG. 1 shows, the profile rails 1 and 2 extend beyond the edge of the support plate 14 parallel to the line direction so that a guide means 17 for an original, for example a paper guide rail or a feeder means for the original can be introduced into the acceptance channel of the profile rails 1 and 2, which is formed by the second and third projections. The guide means is thus introduced into a precisely defined position relative to the supporting surface 16 of the support plate 14.

In FIG. 2, a more detailed illustration of the profile rails 1 and 2 for the embodiment of FIG. 1 is illustrated. In detail, the two profile rails 1 and 2 lie parallel opposite one another and may be seen so that each comprises a first projection 3 and 4, second projections 10 and 11, respectively, and third projections 12 and 13, respectively, on a side facing towards the other profile rail. The respective guide track 5 or 6 is formed on the upper surface of each of the first projections 3 and 4. The scanner carriage 7 carrying the light receiving means 9 has rollers 18 and 19, which rest on the guide tracks 5 and 6. While the carriage 7 has a plurality of rollers 18 and 19, omly one of each is illustrated in FIG. 2. In the region of both profile rails 1 and 2, the scanner carrier or carriage 7 has two abutments or projections 20 and 21 which extend under the respective first projections 3 and 4 of the two rails 1 and 2. The two abutments 20 and 21 have spring elements 23 and 24, respectively, which engage an under surface of the two projections 3 and 4, respectively, and, thus, press the rollers 18 and 19 of the scanner carriage 7 against the guide tracks 5 and 6. In order to enable a play-free bearing of the scanner carriage 7 with respect to the line direction, the guide tracks 5 and 6 are laterally limited by projection-shaped guide strips 25 and 26, respectively, on the first projections 3 and 4. The abutment 21 also includes an additional spring element 27, which is laterally supported against the profile rail 2 for aligning the scanner carrier against the guide strip 26. Each of the third projections 12 and 13 are provided with longitudinally extending stops 28 and 29, which limit the latitude of movement of the scanner carriage 7 away from the guide tracks 5 and 6.

At their upper side, the third projection 12 of the profile rail 1 and the third projection 13 of profile rail 2 each have a channel 30 and 31, respectively, in which an elastic element 32 or 33, respectively, is received. The two elastic strips or elements 32 and 33 form pressure elements which press the transparent support plate 14, which has the supporting surface 16 for the original, against the seating surfaces 34 and 35, respectively, of the second projections 10 and 11 of the two profile rails 1 and 2, which seating surfaces 34 and 35 face towards their corresponding guide tracks 5 and 6.

The two profile rails 1 and 2 also include mounting surfaces 36 and 37, with which the unit shown in FIG. 2 can be inserted into a housing.

Figure 3:
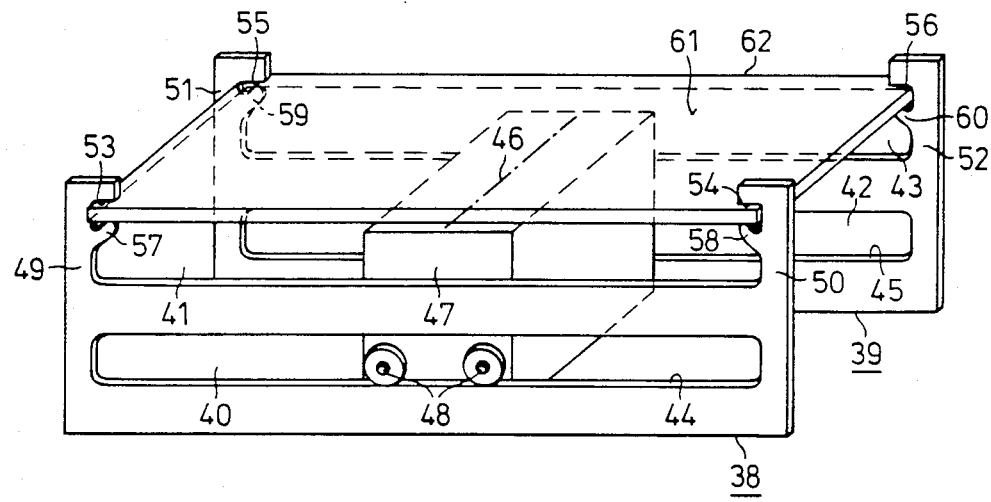
FIG. 3 is a perspective view of a second embodiment of the scanner means of the present invention.

Another embodiment of the scanner means is illustrated in FIG. 3 and has two frame parts or plates 38 and 39. The plate 38 is formed with two punched recesses or apertures 40 and 41, while the plate 39 has recesses or apertures 42 and 43. A lower edge of each of the apertures 40 and 42 form guide tracks 44 and 45, respectively. A scanner carriage 47, which carries a line-shaped light receiving means 46, is displaceably mounted on the two guide tracks 44 and 45 by rollers, such as 48. As a result of the recesses 41 and 43, the two plates 38 and 39 have upstanding mounting parts 49, 50, 51 and 52. The mounting parts 49, 50, 51 and 52 have seating surfaces 53, 54, 55 and 56, respectively, which face towards the guide tracks 44 or 45. Upwardly bent projections 57, 58, 59 and 60 press an upwardly facing supporting surface 62 for an original of the support plate 61 against the seating surfaces 53–56. An extremely exact distance between the guide tracks 44 and 45 and the seating surfaces 53–56 is achieved by punching the apertures 40–43 into the two plates 38 and 39.

Although various minor modifications may be suggested by those versed in the art, it should be understood that we wish to embody within the scope of the patent granted hereon all such modifications as reasonably and properly come within the scope of our contribution to the art.

We claim:

1. In an optical scanner comprising a transparent support plate for an original to be scanned line-by-line, a scanner carriage carrying a line-shaped light receiving means for receiving light from the original, means including two parallel guide elements for mounting the scanner carriage under the support plate for displaceable movement transversely relative to the line direction of the receiving means and parallel to the support plate, the improvements comprising each guide element being a frame part, each frame part having a guide track for supporting the scanner carriage and at least one seating surface facing toward said guide track and being spaced a predetermined distance therefrom, said support plate having its supporting surface for the original engaging said seating surface under the influence of pressure elements.

2. In an optical scanner according to claim 1, wherein each of the frame parts is constructed in the form of a plate having apertures, said guide track being formed by one edge of one aperture and the seating surfaces being formed by an edge of another aperture.

3. In an optical scanner according to claim 1, wherein both frame parts are profiled rails, each rail has a first projection extending from one side to form the guide track, each rail has a second projection extending from the one side forming the seating surface which is in parallel alignment with the guide track, said rails being positioned with the projections of one rail facing the projection of the other rail, and said support plate having two parallel edges of its supporting surface lying against said seating surfaces.

4. In an optical scanner according to claim 3, wherein both profile rails each have a third projection extending from the one side between the first and second projection, said pressure elements being arranged between said third projection and said support plate.

5. In an optical scanner according to claim 4, wherein each of the third projections has a channel facing the second projection, said pressure elements being an elastic strip positioned in said channel to engage the support plate.

6. In an optical scanner according to claim 4, wherein one of the profile rails has a guide surface extending at right angles to the guide track of the rail, said scanner carriage having means for urging the carriage into contact with the guide track and guide surface of the one rail and means for urging contact with the guide track of the other rail.

7. In an optical scanner according to claim 4, wherein the scanner carriage has guide pieces which engage said guide tracks.

8. In an optical scanner according to claim 4, wherein the scanner carriage includes rollers which engage said guide tracks.

9. In an optical scanner according to claim 4, wherein each of said profile rails has projection-type guide strips on the first projections for laterally limiting said guide tracks.

10. In an optical scanner according to claim 4, wherein a scanner carriage includes abutments engaging under respective first projections of said profile rails.

11. In an optical scanner according to claim 4, wherein each of the profile rails has a stop limiting the latitude of movement of the scanner carriage in the direction towards said support plate, said stops being provided on the third projection facing said guide tracks.

12. In an optical scanner according to claim 3, wherein the two profile rails extend beyond the limitations of the support plate in a direction extending transverse to the line direction of the receiving means, said two rails receiving guide means for positioning the original on said support plate.

13. In an optical scanner according to claim 1, wherein the light receiving means is composed of an opto-electronic line sensor which is arranged on said scanner carriage immediately under said support plate.

14. In an optical scanner according to claim 13, wherein both frame parts are formed of plates, each plate having a pair of spaced apertures with the guide tracks and seating surfaces being formed by edges of said apertures.

15. In an optical scanner according to claim 13, wherein both frame parts are profiled rails, each rail having a first projection forming the guide track and a second projection forming the seating surface extending parallel to the guide track, said profile rails being arranged with the projections facing each other and the support plate having two parallel edges of its supporting surface lying against the seating surfaces.

* * * * *